United States Patent [19]

Burpee et al.

[11] 3,810,172

[45] May 7, 1974

[54] DETECTION SYSTEM

[76] Inventors: Lee E. Burpee, 77 N. Castle Cir.;
Donald A. Paynter, 5944 Via Lemora, both of Goleta, Calif. 93017

[22] Filed: July 18, 1972

[21] Appl. No.: 272,831

[52] U.S. Cl............ 343/5 PD, 340/280, 343/6.5 R
[51] Int. Cl............................................. G01s 9/02
[58] Field of Search ....... 340/280; 343/5 PD, 6.5 R, 343/6.5 SS

[56] References Cited
UNITED STATES PATENTS

| | | | |
|---|---|---|---|
| 3,493,955 | 2/1970 | Minasy | 340/280 X |
| 3,713,102 | 1/1973 | Martin | 343/6.5 SS X |
| 2,774,060 | 12/1956 | Thompson | 343/6.5 R X |
| 2,896,204 | 7/1959 | Gille | 343/6.5 R X |
| 3,182,315 | 5/1965 | Sweeney | 343/6.5 SS |
| 3,384,892 | 5/1968 | Postman | 343/6.5 R |

*Primary Examiner*—T. H. Tubbesing
*Attorney, Agent, or Firm*—John E. Wagner; Jerry R. Seiler

[57] ABSTRACT

A system for detecting the presence of resonant circuit targets in a field of electromagnetic radiation. The system includes means for generating a burst of a predetermined single frequency and a detector enabled after the termination of transmission. The detector is sensitive to continued presence of the predetermined frequency indicative of resonant ringing of a target in the field. Time sharing of a common transmitter and detector is accomplished employing a time division multiplex arrangement.

Counterfeit target detection is also accomplished employing a test fixture with valid and invalid target indicators controlled by the system.

In one embodiment, the antenna means is positioned in obstructions or doors which are moved aside by a person passing through the portal. This provides close coupling of energy and the system is provided with an enabling switch operated by displacement of the obstruction or door.

13 Claims, 10 Drawing Figures

DETECTION SYSTEM

REFERENCE TO OTHER RELATED APPLICATIONS

Reference is made to our copending U.S. Pat. application Ser. No. 271,456, filed July 13, 1972 disclosing an INSTRUMENTED TOKEN for use with this invention.

BACKGROUND OF THE INVENTION

Numerous systems have been devised for the detection of the presence of an object in a field or area. Classic for such need are radar systems operating on the principal of the reflection of electromagnetic energy from objects in the field of scan. Ultrasonic and photoelectric systems likewise are triggered by the presence of field or beam interrupting objects.

Certain systems have been designed to detect targets of predetermined characteristics in the field. For example, magnetometers directed toward a passageway have been used as metal detectors.

The U.S. Pat. No. 3,665,448 issued May 23, 1972 to H.A. McGlinchey et al. and 3,665,449 issued the same day to J. T. Elder et al. illustrate typical modern detection systems looking for a token in a field of search. The token or device has typically some active circuit which is either enabled or constantly operative in the presence of a detection system to be detected. The term "active" as used herein relates to any type of target object including a power source whether it be batteries or a source of radiation. Given such an active target the design of detection systems has been greatly simplified since an extremely low power radiation energy can easily be detected by modern receivers as witness, space communications.

The co-pending application of the inventors of this application, we have disclosed an object or target or instrumented token which is totally passive in its components however is capable of producing a detectable signal in the presence of certain incident energy. The instrument includes a resonant circuit and means for coupling energy in and out of the resonant circuit such that when the token is irradiated with energy at a predetermined frequency, a detectable ringing of the incident frequency is radiated by the token and is detectable with an appropriate receiver.

We have invented a system for generating a unique signal to be radiated into a field where instrumented tokens of our other invention may be present and a receiver-detector which can discriminate between the instrumented token and non instrumented devices to distinguish between a genuine and a counterfeit token. We have further developed a system which detects the presence of an instrumented token in the field and have further developed a system which is capable of discriminating between an instrumented token moving into the field in an allowable direction while detecting attempts to remove the token from the work area and responsive to such an attempt to establish an alarm condition.

BRIEF DESCRIPTION OF THE INVENTION

Each of the foregoing is accomplished in accordance with this invention employing a signal generator capable of generating a plurality of discrete frequencies on demand and coupled to a transmitting loop having a field embracing the field to be scanned. A broad band receiver is tuned to respond to the frequencies of interest and also includes a receiving antenna having a field coextensive with the transmitting antenna in the field.

A timer and control circuit establishes the time sequence for the transmission of bursts of energy in the preselected frequencies and for enabling the receiver at the appropriate time for the detection of the presence of one or more of the selected frequencies. The receiver circuit includes a detector and an alarm. In another embodiment a single antenna loop is coupled through a transmit/receive (T/R) switch to be time shared between the signal generator and receiver.

In another embodiment a pair of loops are time shared between the transmitter and receiver and additionally are connected in alternate sequence to the signal generator whereby full transmitting power is applied to each of the loops alternately in sequence thereby increasing the detectability of tokens in the total field encompassed by the two loops.

Also disclosed is a portal system including a preferential direction of travel in which the detection system is activated in one direction only.

BRIEF DESCRIPTION OF THE DRAWING

These features may be more clearly understood from the following detailed description and by reference to the drawing in which.

DETAILED DESCRIPTION OF THE INVENTION

Figure 1:
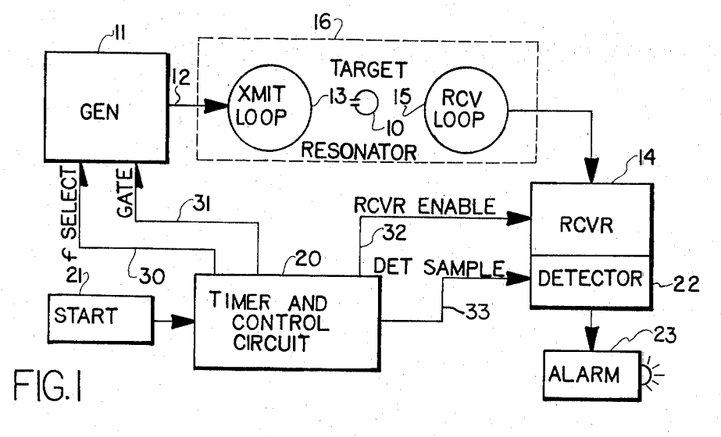
FIG. 1 is a block diagram of the system in this invention.

Now referring to FIG. 1 the system of this invention is designed to detect an instrumented token of the type disclosed in our above referenced co-pending application which is represented generally as target resonator 10. Basically for the purpose of this discussion it involves a dielectric body which is omitted in the drawing for convenience in which is embedded or on which is printed a resonant circuit comprising a single turn coil and capacitance element in a series closed circuit. The coil is of sufficient size to couple energy in the area and has a predetermined inductance value.

The capacitance element joining the ends of the coil is similarly selected in value whereby the resonant frequency of the combination inductance and capacitance is in the range of operation of the system.

The system includes basically a signal generator 11 coupled by a transmission line 12 to a transmitting antenna or loop 13 which cooperates with a receiver 14 having a similar receiving loop or antenna 15 coupled thereto. The transmitting loop 13 and receiving loop 15 are so positioned to embrace a common field generally designated 16 in which the presence of a target 10 is to be detected. It is apparent that depending on the nature of the installation this field may be a passageway, a portal, a storage space or whatever the need dictates. The field preferably is a portal through which instrumented tokens might pass if they are to enter or leave a designated area.

In addition to the foregoing elements of the invention there are critical sub-systems. First is the Timer and Control Circuit 20 which is under the control of an initiate or start circuit 21 and serves to establish the sequencing of operation of both the generator 11 and the receiver 14. The Timer and Control Circuit 20 additionally controls the operation of a detector 22 which is coupled to the receiver 14. The detector 22 serves the function of detecting the presence of a target 10 ringing signal in the field and energizing an alarm 23.

SYSTEM OPERATION

Before a detailed explanation of the circuitry of these components, a fundamental explanation of the operation of the system is believed to be in order. This is best undertaken by reference to FIG. 1 in cooperation with FIG. 2 which shows the time sequence of the system and the nature of the signals generated and received. Now referring to FIG. 2 it may be seen that the generator 11 is periodically enabled for a short burst of energy to be applied to the generating loop 13. This energization occurs at time position 1 and lasts to time position 2 on the time sequence diagram. At a later interval the generator 11 is again energized at time position 3 and deenergized at time position 4. The bursts of energy may be in the order of 2 microseconds in length and spaced 2 milliseconds apart. The length of the transmission is selected so that sufficient energy is radiated into the field. Referring to the curve labeled Generator Output, it is apparent that during the time period 1–2, energy is radiated at the first frequency labeled $f1$ and during the time period 3–4 energy is radiated at a different frequency $f2$. Following each of the periods 1–2 and 3–4 there is a residual of low level radiation as a result of the inability of switching circuits to terminate the generation and transmission instantaneously. This appears as a slight ripple following the two periods of transmission 1–2 and 3–4. The system as illustrated in FIG. 1 includes the target 10 in the field of the generator transmitting loop 13.

Figure 2:
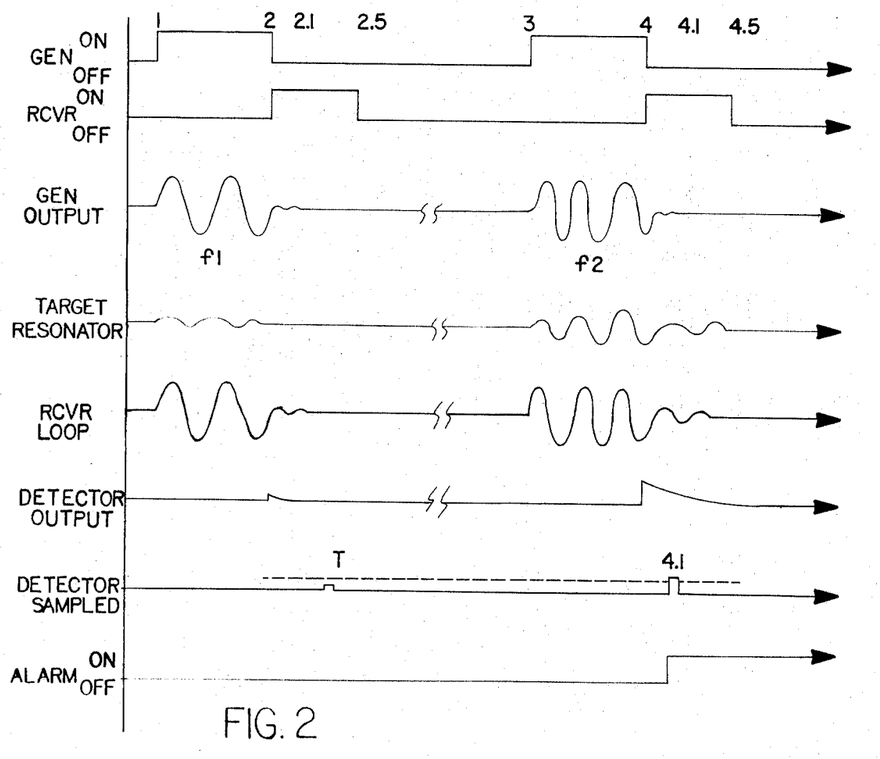
FIG. 2 is a graphical representation of a time sequence of the system of FIG. 1.

The target resonance circuit 10 responds to the incident energy and generates a ringing signal which is detectable in the field. The signal level is dependent upon the level of incident energy, the Q of the resonant circuit 10 and the accuracy of tuning between the frequency radiated $f1$ and the resonant frequency of the target 10. As illustrated in FIG. 2 the frequency $f1$ is near resonance of the target 10 and a low level ringing signal is generated by the target 10. However, as illustrated in the same figure, the target 10 is actually resonant at frequency $f2$ and it exhibits a build-up of energy reaching a maximum amplitude at the time of termination of generator 11 (output time position 4) and followed by a decay of the target signal. The falloff of the level of the target signal is slow and exponential as compared with the abrupt cutoff of the transmitter in both frequencies $f1$ and $f2$.

The receiver loop 15 encompassing the field of transmission of loop 13 and the target 10 responds as shown in the curve Receiver Loop. The loop 15 output fairly well reflects the generator output at frequency $f1$ with very little effect by the off resonant target resonator 10. In the case of the time interval 3–4 the receiver loop again being broadly tuned responds to produce an accurate reproduction of the transmission $f2$ and upon the termination of transmission by the generator 11 responds accurately to the radiation from the target resonator 10. The response curve thereby includes a high level period 3–4 followed by a decaying level signal during period 4–5. The detector 22 of FIG. 1 is an envelope detector and is enabled by the timing circuit 20 after period time position 2 and 4 and in fact after each burst of energy from the generator 11. The detector 22 produces an output signal level related to the energy in the field after completion of transmission by the generator. Immediately following period 2 a small exponentially decaying signal is apparent in the curve Detector Output and after time position 4 the similar curve of significant magnitude is present at the detector 22 output. The detector 22 output is sampled at a time 2.1 and 4.1 and that level compared with a threshhold T on the curve Detector Sampled. It is apparent that at time period 4.1 the threshhold T is exceeded and responsive to detection of such a signal the alarm 23 is energized as shown in the curve alarm. The alarm will remain active until reset.

The foregoing describes the fundamental operation of this system and it is apparent that detection is accomplished by examination of the field of interest after the termination of transmission of each burst of energy. The examination includes looking for the predetermined frequency in a level greater than that residual from the previous burst of energy. The greater level indicates the presence of a ringing of the resonant circuit. It is also apparent that all active elements of the system are contained in the generator receiver timing control circuit and the target itself is passive but acts like an active element.

TIMER AND CONTROL CIRCUIT

In order to carry out the time sequence shown in FIG. 2, the time and control circuit 20 provides a pair of input control signals to the generator 11. One of the signals over lead 30 selects $n$ frequencies to be transmitted, energizes the appropriate oscillator in sequence and then repeats the sequence. The timer and control circuit 20 also provides a gating signal over lead 31 which passes each burst of energy to the transmitting loop 13 for the period of time represented in FIG. 2 by time intervals 1–2 and 3–4. The timer and control circuit 20 also enables the receiver 14 over lead 32 at a predetermined period, namely, periods 2–2.5 and 4–4.5 after the completion of transmission of each burst of energy by the generator 11. The timing and control circuit 20 likewise over lead 33 establishing the time for sampling the detector output designated in FIG. 2 as time periods 2.1 and 4.1. Each of the foregoing time intervals do not indicate any absolute period but rather a relative time which is related to the overall scale of time in the detection system. For example where the detection system is designed to detect the passage of a token through a portal carried by a human, the passage period may take one or more seconds. In such case a recommended values for time intervals are as follows:

| | | |
|---|---|---|
| 1–2 | 2 μsec | μ=Micro |
| 2–2.5 | 2 μsec | |
| 2–2.1 | 1 μsec | |
| 2–4 | 2m sec | m=milli |

GENERATOR

Figure 3:
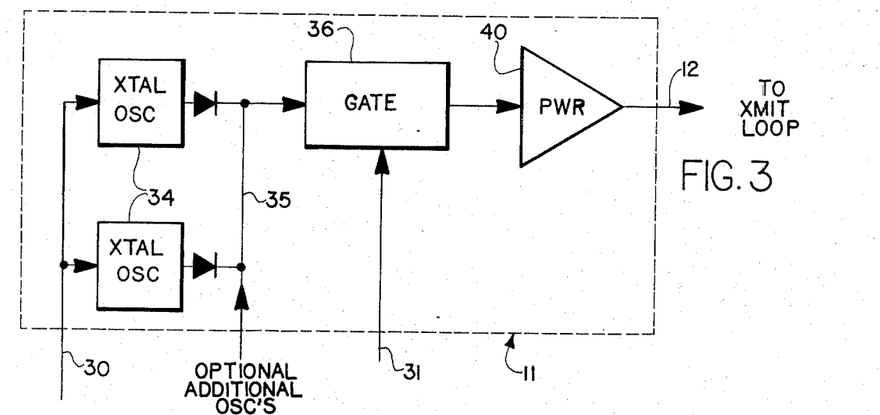
FIG. 3 is a block diagram of the generator of FIG. 1.

Given the foregoing description of the system of this invention the signal generator 11 requires description. It is best seen in FIG. 3. The generator 11 includes bascially a number of crystal oscillators 34, two of which are shown although five is the number found to be most suitable. These oscillators are triggered into operation over lead 30 from the timer circuit 20. The output of the selected oscillator is introduced via lead 35 to gate 36. A gating pulse over lead 31 from the timer circuit 20 to gate 36 serves to pass the burst of energy from the oscillators 34 for the required duration to a power amplifier 40 which drives the transmitter loop 13 of FIg. 1 over lead 12. Each of the foregoing components are standard in design and given the two control signals from the timer 20 over leads 30 and 31 operate easily as described above.

TIMING AND CONTROL CIRCUIT

Figure 4:
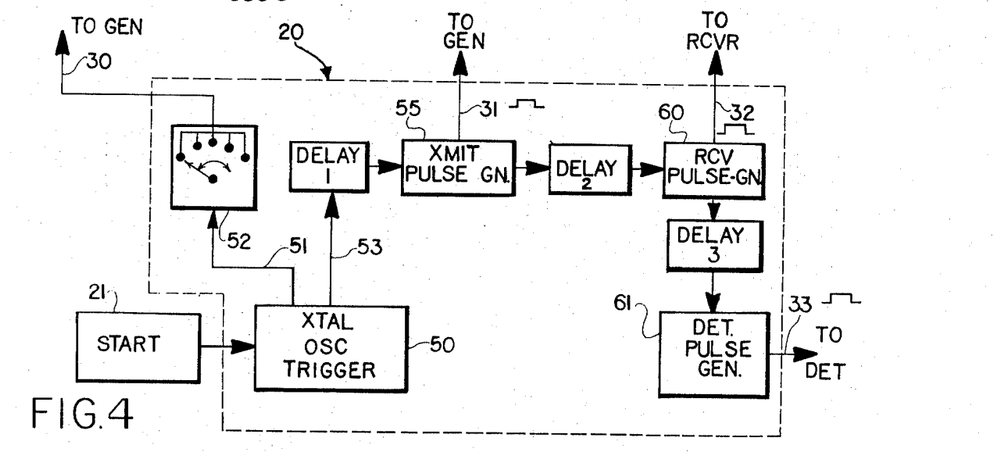
FIG. 4 is a block diagram of the Timer and Control Circuit of FIG. 1.

The operation of the timer in the control circuit 20 and its components are seen in FIG. 4. The circuit 20 itself is driven by the start circuit 21 which may merely be a switch or as shown below in FIG. 8 a more complex starting circuit. The circuit 20 includes basically a trigger circuit 50 which produces in response to the start pulse a train of operating pulses for the system. This trigger 50 produces the basic time sequence of 1–3 etc. The trigger circuit 50 over lead 51 drives a sequence switch 52 represented simply as a stepping switch for selecting each of the frequencies of those that are used in the system. The switch 52 over lead 30 provides the enabling signals to each of the oscillators 34 shown in FIG. 3. The trigger circuit 50 produces an operating pulse for establishing the timing sequence for the gating portions of the system over lead 53. After a delay as determined by delay no. 1 a transmitting pulse generator 55 is triggered producing the pulse over lead 31 to energize the gate 36 of generator 11 for the period 1–2 or 3–4, etc. The transmitter pulse also is applied to delay 2 which then triggers the receiver pulse generator 60 to enable the receiver over lead 32 during periods 2–2.5 and 4–4.5. The receiver pulse generator 60 also applies a pulse through delay 3 to the detector pulse generator 61 which in turn generates an enabling pulse for the detector 22 of FIG. 1 at time interval 2.1, 4.1, etc. which is applied to the detector over lead 33.

It can therefore be seen that the function of the timing and control circuit 20 is primarily the generation of enabling pulses at the selected correct time interval and to repeat this sequence of enabling pulses during the period of time of operation of the system when once initiated by the start circuit 21.

MULTIPLEXED OPERATION

In the foregoing description of the system individual loops 13 and 15 are used and each because of their necessary spacial displacement will encompass a slightly different field.

Figure 5:
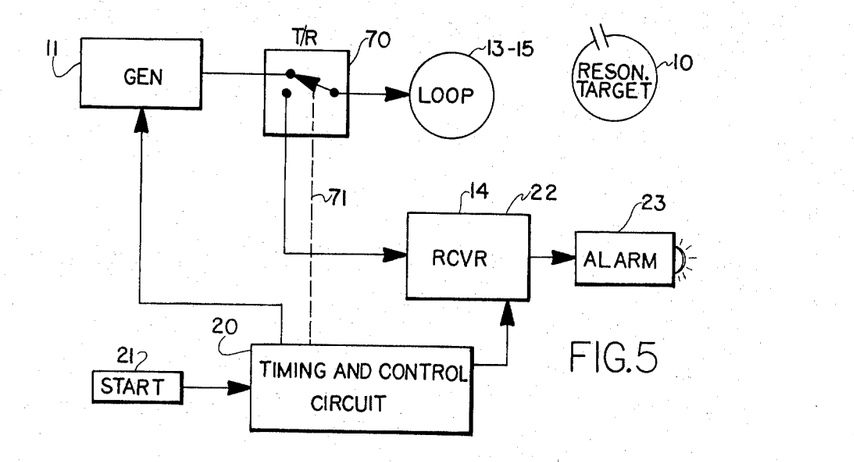
FIG. 5 is a block diagram of an alternate embodiment of this invention.

In FIG. 5 the use of a common transmitting and receiving loop is illustrated.

In FIG. 5 all elements of the system which are identical with the disclosure FIG. 1 carry the same designation and no further explanation of their operation is necessary. In this case a single loop 13–15 provides the function of transmitting and receiving. It is connected to the generator and receiver through a transmit receive (T/R) switch 70 which is illustrated merely as a mechanical switch for purposes of clarity and driven by the timer 20 via the dashed line 71. The use of this system in FIG. 5 with time sharing of the transmitting loop is possible since the transmitter and receiver are not enabled at the same time and further provides a function of more complete isolation of the receiver from the transmitter to minimize the holdover transient illustrated during the periods 2–2.1 and 4–4.1 of FIG. 2 in the curve Generator Output. In this embodiment the generator 11 is no longer connected to the transmitting antenna so this transient is not transmitted into the field of interest. The mechanical coupling between the T/R switch 70 and the time and control circuit 20 are in actuality not present and an electronic control is used instead. From an examination of FIG. 4 it is apparent that the receiver enabling pulse 32 can be applied instead to the T/R switch 70 to provide the necessary switching from generator 11 to receiver 14 and return at the end of the receiver enabling pulse periods 2.5 and 4.5 of FIG. 2.

Figure 6:
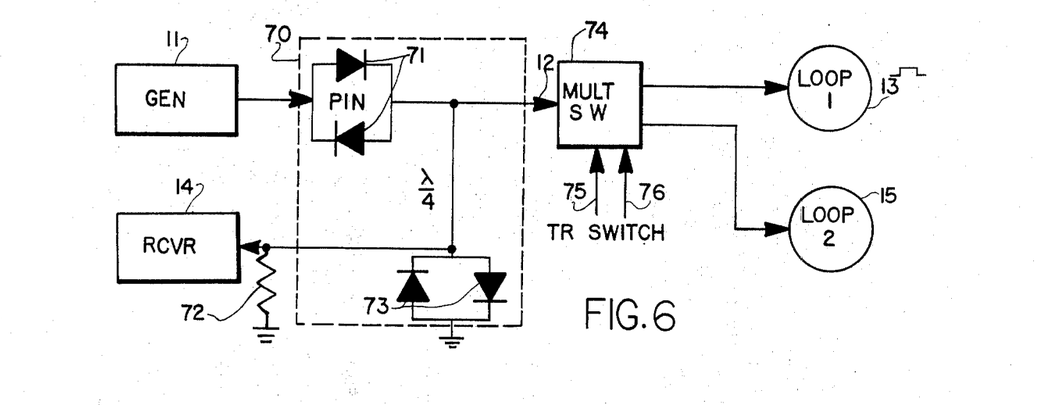
FIG. 6 is an electrical schematic of a T/R switch arrangement of the circuit of the block diagram of FIG. 5.

A suitable form of electronic T/R switch for use in the system of FIG. 5 appears in FIG. 6. The T/R switch 70 of FIG. 6 includes oppositely poled parallel connected PIN diodes 72 in series with the lead 12 from the generator 11. The receiver 14 is connected by a quarter wave length transmission line to the lead 12 and it has a shunt path to ground in the form of a similar pair of oppositely poled parallel connected PIN diodes 73. A terminating resistance 72 is also connected between the receiver 14 output and ground. The PIN diodes are signal responsive and selected for the appropriate signal levels on which they are required to operate. The PIN diodes 71 respond to a signal from the generator 11 to provide a conductive path to lead 12. At the same time the pin diodes 73 are responsive to the transmitted signal to provide a short circuit to ground of any generator signal transversing the path towards the receiver. The quarter wave length transmission line and short circuit provided by PIN diodes 73 make the receiver line appear as an open circuit and substantially all signal energy from generator 11 passes to the loop 13–15.

Therefore, employing pin diodes in the configurations shown, a signal responsive T/R switch for the alternate embodiment of FIg. 5 is illustrated. This eliminates the need of the connection 71 of FIG. 5 and lead 32 of FIGS. 1 and 4.

FIG. 6 also illustrates a feature of this invention allowing the operation of the system with minimum required transmitting power and still obtaining maximum field coverage. This is possible through the addition of a multiplexing switch 74 between lead 12 and a pair of antennas or loops 13–15. In this case in FIG. 6 a pair of loops 13–15 are used to effectively cover the field and these loops are alternately both used for transmitting and receiving under the control of the T/R switch 70. A multiplex switch 74 is used to alternately feed loops 13 and 15. The multiplexer switch 74 is operated by control signals over leads 75 and 76 to energize loops 13 and 15 alternately. This multiplex operation of the transmitting and receiving loops is particularly desireable when the observation time is long in comparison with the detection time; for example as indicated above where the time to pass through a portal is measured in seconds and the system detection operation cycle is measured in milliseconds.

Figure 7:
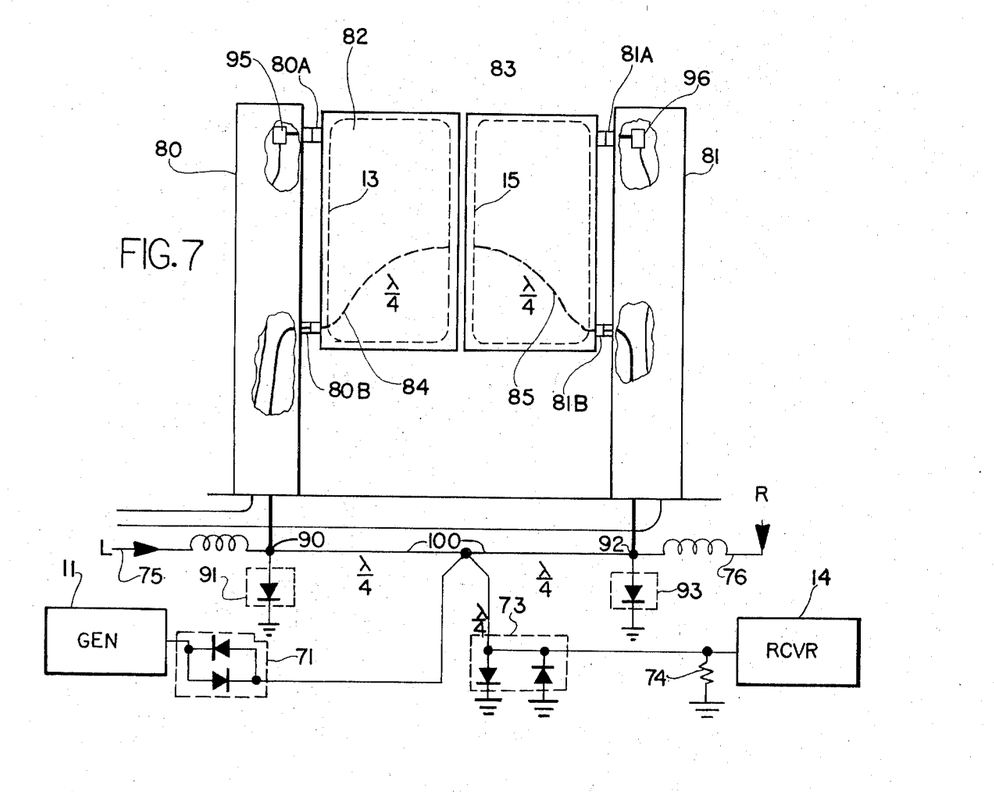
FIG. 7 is a simplified diagram shown partly in phantom view a portal system incorporating this invention.

The utility of this multiplexing technique is particularly apparent in the use of a portal of the type disclosed in FIG. 7. It includes a pair of walls or stanchions 80 and 81 which through hinges 80 A and B and 81 A and B support swinging doors 82 and 83 which virtually enclose the opening between the stanchions 80 and 81 so that any person entering the area behind must pass in immediate contact with the doors 82 and 83 and to displace them from the normal closed position. Concealed within the doors 82 and 83 are loop antennas designated for convenience 13 and 15 corresponding to FIG. 1 although employing the multiplexing technique of FIG. 6 these loops are not each restricted to one function. Hinges 80 B and 81 B include respective feed through conductors 84 and 85 which feed the loops 13 and 15. The feed point in each case is at the outermost point of the door away from the hinges for optimum field strength in the opening.

In FIG. 7 the portal is shown connected for multiplex operation in the manner as shown in FIG. 6 while it is obvious that it can be connected in the simplest form of FIG. 1.

The PIN diode switches and terminating resistor as well as quarter wave length transmission lines of FIG. 6 are present in FIG. 7 and an additional set of quarter wave length transmission lines 100 and shunting diodes 91 and 93 are also present for use in the multiplexing of the two loops during the transmission and receive cycles. In this case lead 84 is one quarter wave length in length between loop 13 junction 90 at the connection to ground through pin diode assembly 91 and the feed point for control signals over lead 75. Similarly lead 85 is one quarter wave length in length to junction point 92 of pin diode assembly 93 to ground and the control lead 76.

Figures 8, 9:
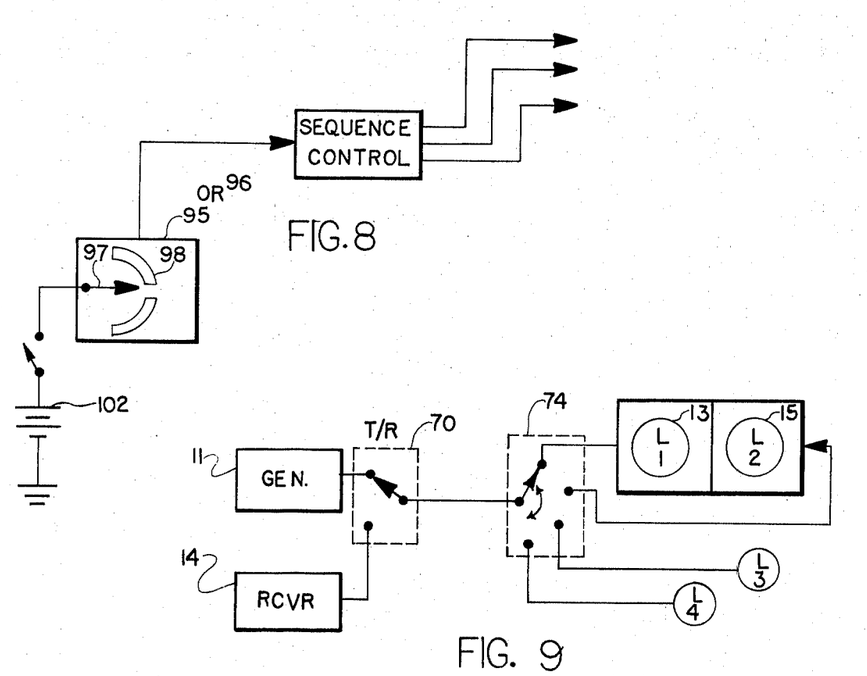
FIG. 8 is a simplified schematic of the portal system of FIG. 7.
FIG. 9 is a block diagram of another alternate embodiment of this invention.

This arrangement allows the alternate feeding of transmitted energy to loops 13 and 15 and the alternate energizing of loops 13 and 15 for reception with optimum signal transmission. Therefore incorporating the arrangement of FIGS. 6 and 7 both the generator 11 and receiver 14 time share the antenna system and the two antennas 13 and 15 making up the system are alternately fed with all power from the generator 11 to maximize the field coverage with the minimum total power. The portal also includes a switch 95 in portal 80 and similar switch 96 in portal 81. These portal switches are shown in FIG. 8 in which their function is more clearly shown.

Commonly employed, in a system of the type shown in FIG. 7, the transportation of instrumented tokens in one direction through the portal is authorized but the removal of tokens through the same portal in the opposite direction is to be detected. In this case each of the doors 82 and 83 include their respective portal switches 95 and 96 which detect the direction of swing of the doors. The portal switches 95 and 96 are parts of the start switch 21 of FIGS. 1 and 5 and apply power from a power supply 102 to the sequence and control circuitry of FIG. 7. The arm 97 of switches 95 and 96 is coupled to the respective door 82 or 83 and is displaced in the one direction or the other depending upon the direction movement of the door. If the door moves in the outward (unauthorized token movement) direction the arm 97 moves into contact with plate 98 energizing the detection system. Movement in the opposite direction does not energize the system. Therefore the lawful transportation of instrumented tokens in the correct direction does not produce an alarm condition.

Figure 10:
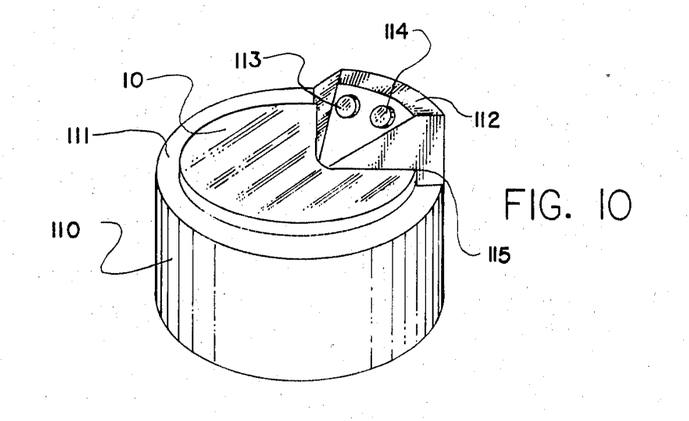
FIG. 10 is a perspective view of a token checking device.

Given the foregoing description, it is apparent that we have derived a system for the detection of possibly instrumented tokens through a portal or into a controlled area. On certain occasions it is desireable to check for counterfeit tokens. This is accomplished using one or more remote sensors which normally time share the generator, receiver and timing and control circuit. Such an arrangement is shown in simplified schematic form in FIG. 9. It again includes a generator 11, receiver 14, a T/R switch 70, and a multiplexing switch 74 all of the type disclosed in FIG. 6. It likewise includes a pair of normal loops 13 and 15. Additionally, a pair of remote sensors designated with loop 3 and loop 4 are connected to the sequencing switch 72. Loops 3 and 4 are compact in size and may include a number of turns. A typical sensor incorporating loop 3 or 4 and designed for a circular disc token is shown in FIG. 10 as a remote sensing station. It includes the loop 3 or 4 concealed within the base 110 adjacent to a planar platform 111. The sensor includes a small inclined console 112 with a pair of indicator lamps 113 and 114 for example, one red and one green. The console 112 overlies the platform 111 of the base 110 and defines a recess 115 to receive a token 10. Employing the system of FIG. 9 with automatic sequencing of all sensors including the sensor of FIG. 10, the validity of a token in question may be determined merely by placing the token 10 on the platform 111 with its edge in the slot 115 so that the token is in coupling relationship with the loop concealed within the base 110. The system is coupled to the indicator lamps 113 and 114. A genuine token will cause illumination of the green lamp if a genuine ringing signal is detected. If not the red lamp will be lighted alerting the person making the test.

We have described a system for the detection of passive instrumented tokens and the discrimination between the genuine and counterfeit tokens.

The system does not require any active elements in the instrumented token and therefore the cost of such tokens incorporating the invention is minimal and there is no need to replace energy sources. The system is frequency sensitive but employing a step or frequency approach allowing for variation in the actual resonant frequency of targets or for change of resonance which might occur due to the presence of metalic bodies or other loading. The system is ideal for time shared operation thus allowing a signal generator, timer and control circuit and receiver to service a number of protected areas or sensors. A novel portal arrangement likewise is disclosed and one which assures maximum coupling to persons or objects passing through the portal for target detection.

The above-described embodiments of this invention are merely descriptive of its principles and are not to be considered limiting. The scope of this invention instead shall be determined from the scope of the following claims, including their equivalents.

What is claimed is:

1. A system for detecting the presence of a resonant target in a field of interest comprising:
   - means for generating a signal containing the resonant frequency of the target to be detected;
   - antenna means coupled to said generating means for radiating the electromagnetic energy in the predetermined resonant frequency into a field of interest;
   - means for periodically gating said generator on and off;
   - means for receiving electromagnetic energy in the field as radiated by said antenna means;
   - detector means coupled to said receiving means for detecting the presence of the predetermined frequency in the field of interest;
   - means for enabling said detector means at a time interval following the termination of transmission of energy by said generator;
   - alarm means responsive to the detection of electromagnetic energy in the field of interest after termination of transmission by said generator; wherein
   - said generator means produces a plurality of discrete frequencies each in timed sequence and including means for sequentially gating those frequencies for introduction into the transmitting antenna.

2. The combination in accordance with claim 1 wherein said system is under the control of a timer and control circuit which in sequence enables the frequency generator, gates the energy from the frequency generator to the transmitting antenna, enables the receiving means and enables the detector and wherein said timing and control circuit performs the foregoing sequence for each frequency generated.

3. A system for detecting the presence of a resonant target in a field of interest comprising;
   - means for generating a signal containing the resonant frequency of the target to be detected;
   - antenna means coupled to said generating means for radiating the electromagnetic energy in the predetermined resonant frequency into a field of interest;
   - means for periodically gating said generator on and off;
   - means for receiving electromagnetic energy in the field as radiated by said antenna means;
   - detector means coupled to said receiving means for detecting the presence of the predetermined frequency in the field of interest;
   - means for enabling said detector means at a time interval following the termination of transmission of energy by said generator;
   - alarm means responsive to the detection of electromagnetic energy in the field of interest after termination of transmission by said generator; and
   - switch means responsive to the entrance of a person into a field to be scanned for initiating the operation of the system.

4. The combination in accordance with claim 3 wherein said switch means is responsive to displacement of an obstruction by the person to initiate a system in operation.

5. The combination in accordance with claim 4 wherein said antenna means form a part of said obstruction for closed coupling between the person passing through the area and the energy introduced into the area of search.

6. A system for detecting the presence of a resonant target in a field of interest comprising;
   - means for generating a signal containing the resonant frequency of the target to be detected;
   - antenna means coupled to said generating means for radiating the electromagnetic energy in the predetermined resonant frequency into a field of interest;
   - means for periodically gating said generator on and off;
   - means for receiving electromagnetic energy in the field as radiated by said antenna means;
   - detector means coupled to said receiving means for detecting the presence of the predetermined frequency in the field of interest;
   - means for enabling said detector means at a time interval following the termination of transmission of energy by said generator;
   - alarm means responsive to the detection of electromagnetic energy in the field of interest after termination of transmission by said generator; whereby
   - said system is under the control of a timer and control circuit which sequence enables the frequency generator, gates the energy from the frequency generator to the transmitting antenna, and enables the receiving means and the detector; wherein
   - said timing and control circuit includes a trigger circuit for generating the sequence of pulses to initiate each transmission and to scan the system of the field to be detected; and
   - a plurality of delay circuits connected between pulse generators for said transmitter, receiver and detector respectively.

7. A system for detecting the presence of a resonant target in a field comprising;
   - a generator for producing a predetermined frequency corresponding to the resonant frequency of said target;
   - a receiver responsive to electromagnetic radiation in the frequency of interest;
   - antenna means having a field encompassing the field to be observed;
   - switch means for alternately connecting the generator and receiver to the antenna;
   - detector means responsive to energy in the predetermined frequency above a selected minimum level;
   - timing means for enabling said detector during each period of time when said receiver is connected to said antenna and said generator is disconnected from said antenna;
   - alarm means connected to said detector for indicating an alarm condition when said detector detects the presence of a predetermined frequency above the selected level; wherein
   - said switch means comprises a pair of oppositely poled PIN diodes parallel connected and in series between said generator and said antenna;
   - a pair of oppositely poled parallel connected PIN diodes connected in shunt between said receiver and ground;
   - said first and second sets of PIN diodes being responsive to signal energy from said generator to enable the connection between said generator and said antenna and disable the connection between said receiver and said antenna;

said PIN diodes being responsive to the termination of energy from said generator to said antenna for interrupting the conduction path between said generator and said antenna and connecting said receiver to said antenna.

8. The combination in accordance with claim 7 including a pair of antennas each spaced from each other encompassing a substantially common field and means for alternately switching signal path between said generator and said antennas, the transmission of energy from said generator; and said means operative to alternate the connection between said receiver and said antennas during operation of said receiver.

9. A system for detecting instrumented tokens having a passive resonant circuit therein and means for coupling energy in and out of said circuit;

said system comprising means for generating selected frequencies in a band encompassing the resonant frequency of instrumented tokens to be detected;

first antenna means for radiating said selected frequencies into a predetermined field subject to monitoring for the presence or absence of instrumented tokens;

receiver means responsive to electromagnetic radiation in the band of frequencies transmitted;

second antenna means connected to said receiver and positioned to detect radiation in said predetermined field;

a detector for detecting energy in such preselected frequencies above a predetermined threshhold;

gate means for enabling said transmitter to introduce energy in one or more of the preselected frequencies into said field;

second gate means for periodically enabling said receiver after the termination of each transmission by said receiver said detector being operative to detect substantial electromagnetic energy in said field indicative of the presence of the resonant circuit of an instrumented token in said field.

10. The combination in accordance with claim 9 wherein said transmitter and receiver are coupled to a portal area while monitoring the passage of an instrumented token through said portal.

11. The combination in accordance with claim 10 wherein said portal includes at least one door displaced in passing through the portal;

and said antenna means are secured to said door for close coupling between the system and a passerby.

12. The combination in accordance with claim 11 wherein said portal includes a pair by directional swinging doors with said first antenna means secured to one of the doors and said second antenna means secured to the second of said doors.

13. The combination in accordance with claim 12 including switch means responsive to the initial direction of movement of said doors to enable the operation of said system.

* * * * *